United States Patent
Sun

(10) Patent No.: US 9,651,760 B2
(45) Date of Patent: May 16, 2017

(54) IMAGING LENS AND IMAGING APPARATUS

(71) Applicant: FUJIFILM Corporation, Tokyo (JP)

(72) Inventor: Ping Sun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/013,418

(22) Filed: Feb. 2, 2016

(65) Prior Publication Data

US 2016/0238819 A1    Aug. 18, 2016

(30) Foreign Application Priority Data

Feb. 13, 2015 (JP) ................................ 2015-026071

(51) Int. Cl.

| | |
|---|---|
| *G02B 9/14* | (2006.01) |
| *G02B 15/14* | (2006.01) |
| *G02B 13/02* | (2006.01) |
| *G02B 15/28* | (2006.01) |
| *G02B 15/173* | (2006.01) |

(52) U.S. Cl.
CPC ............. *G02B 13/02* (2013.01); *G02B 9/14* (2013.01); *G02B 15/173* (2013.01); *G02B 15/28* (2013.01)

(58) Field of Classification Search
CPC ......... G02B 15/173; G02B 15/28; G02B 9/14
USPC ................ 359/689, 690, 716, 753, 784, 785
See application file for complete search history.

(56) References Cited

U.S. PATENT DOCUMENTS 6,115,188 A * 9/2000 Nishio ................. G02B 15/173
359/557

FOREIGN PATENT DOCUMENTS

| JP | 4898408 B2 | 3/2012 |
|---|---|---|
| JP | 5429244 B2 | 2/2014 |

* cited by examiner

*Primary Examiner* — William Choi
(74) *Attorney, Agent, or Firm* — Studebaker & Brackett PC

(57) ABSTRACT

An imaging lens consists essentially of, in order from the object side, a positive first lens group, a negative second lens group, a stop, and a positive third lens group. Focusing is effected by moving only the second lens group along the optical axis direction. Each of the first lens group and the third lens group includes at least three positive lenses and at least two negative lenses. The imaging lens satisfies the condition expression (1) below:

$$0.53 < -f2/f < 0.9 \qquad (1),$$

where f2 is a focal length of the second lens group, and f is a focal length of the entire system when the imaging lens is focused on an object at infinity.

20 Claims, 9 Drawing Sheets

EXAMPLE 1

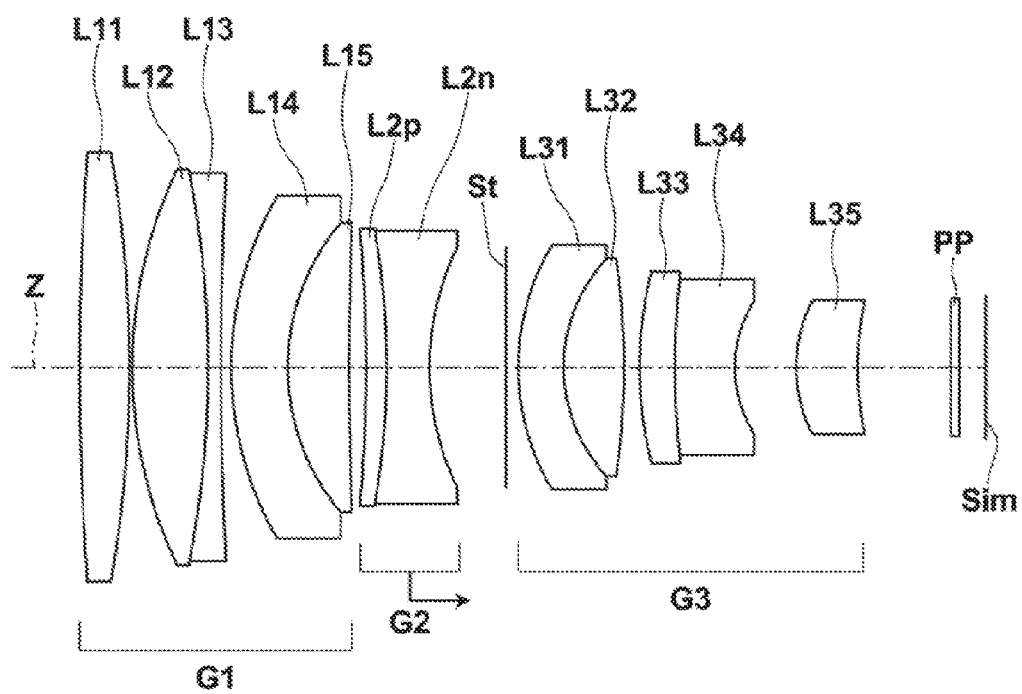
FIG.1 EXAMPLE 1
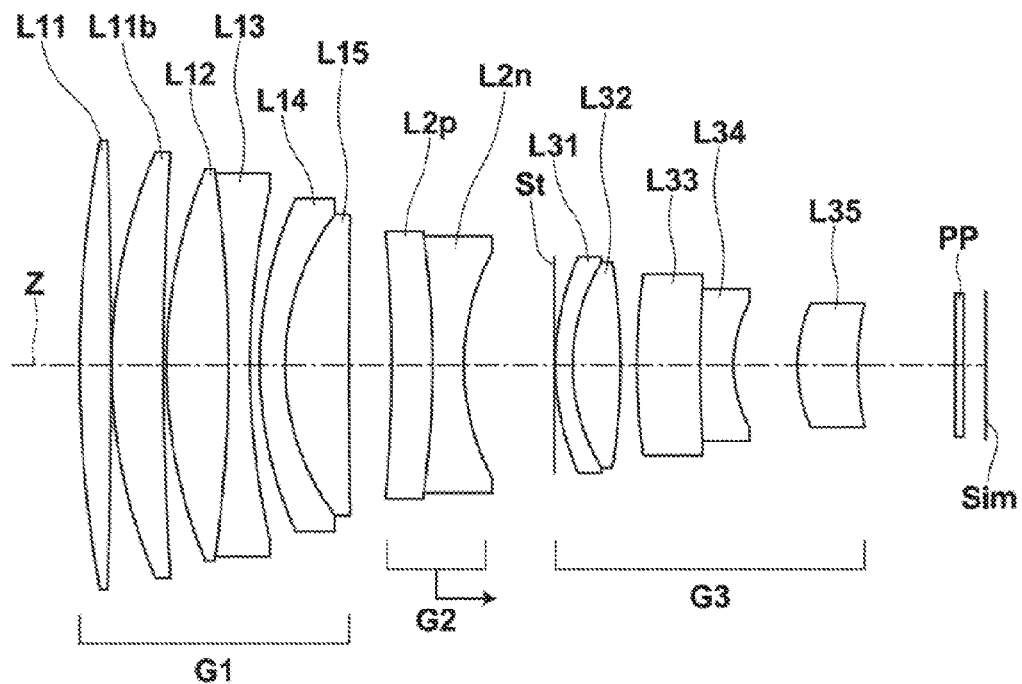
FIG.2 EXAMPLE 2

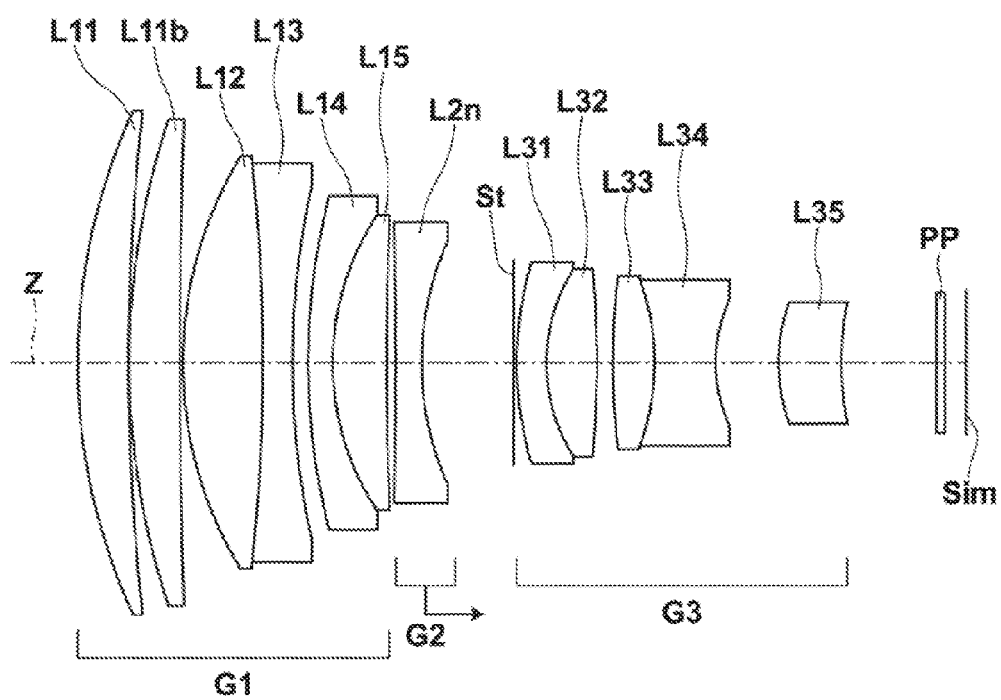
FIG.3 EXAMPLE 3
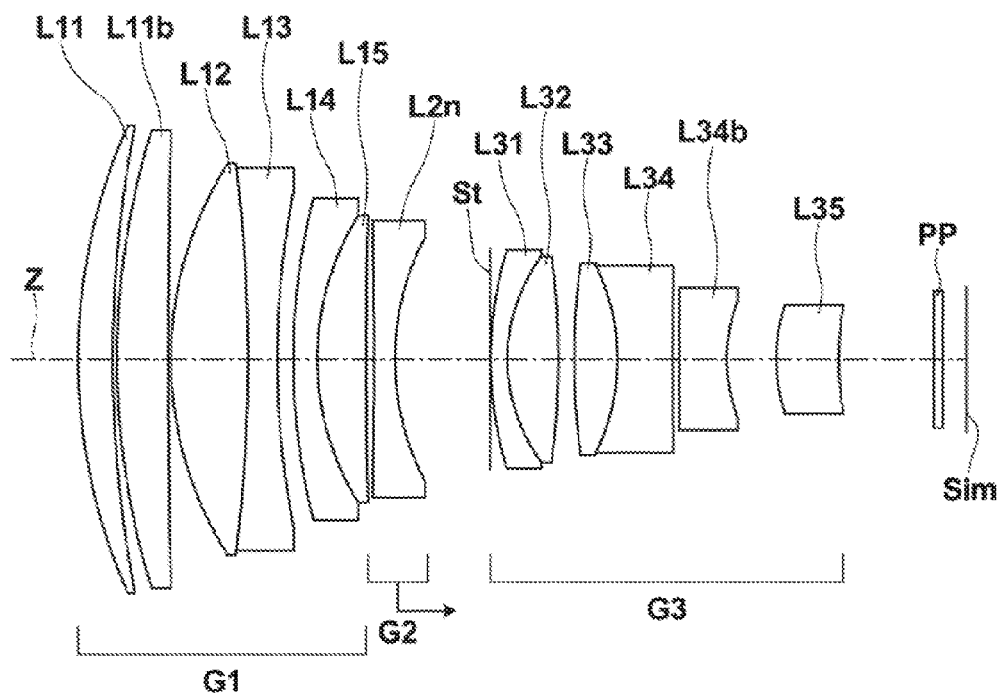
FIG.4 EXAMPLE 4

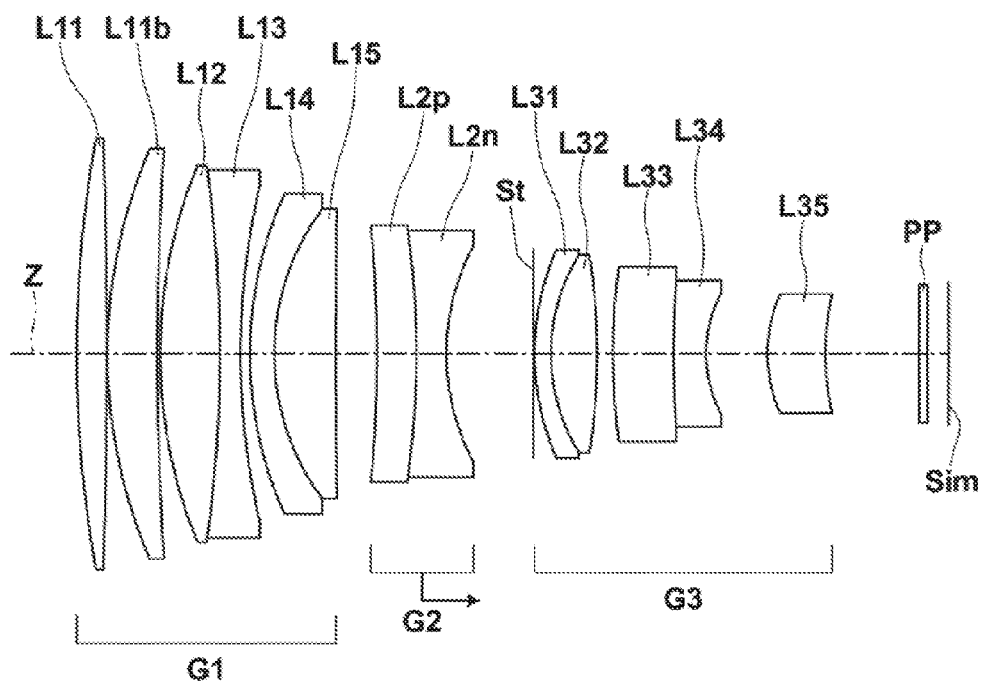

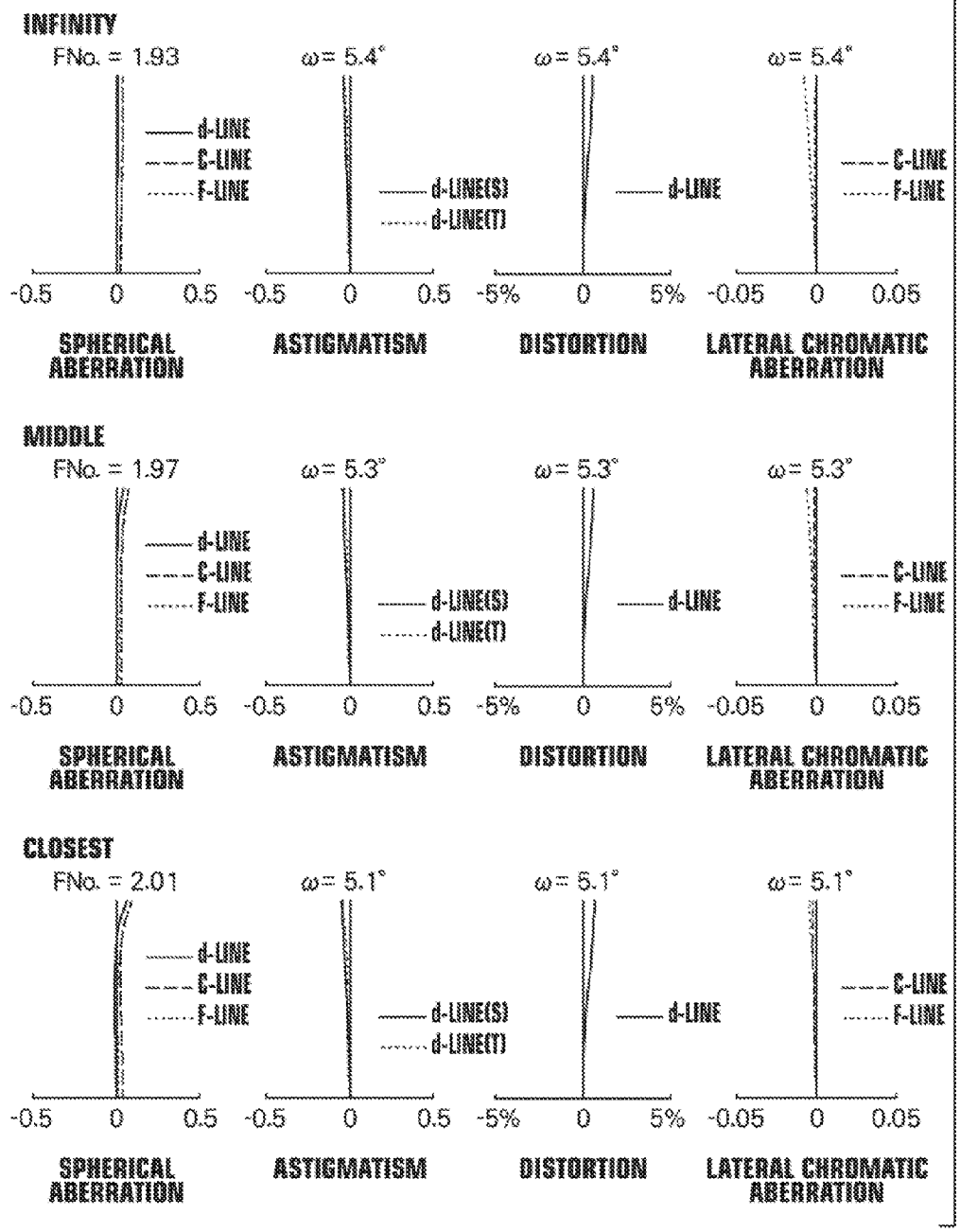

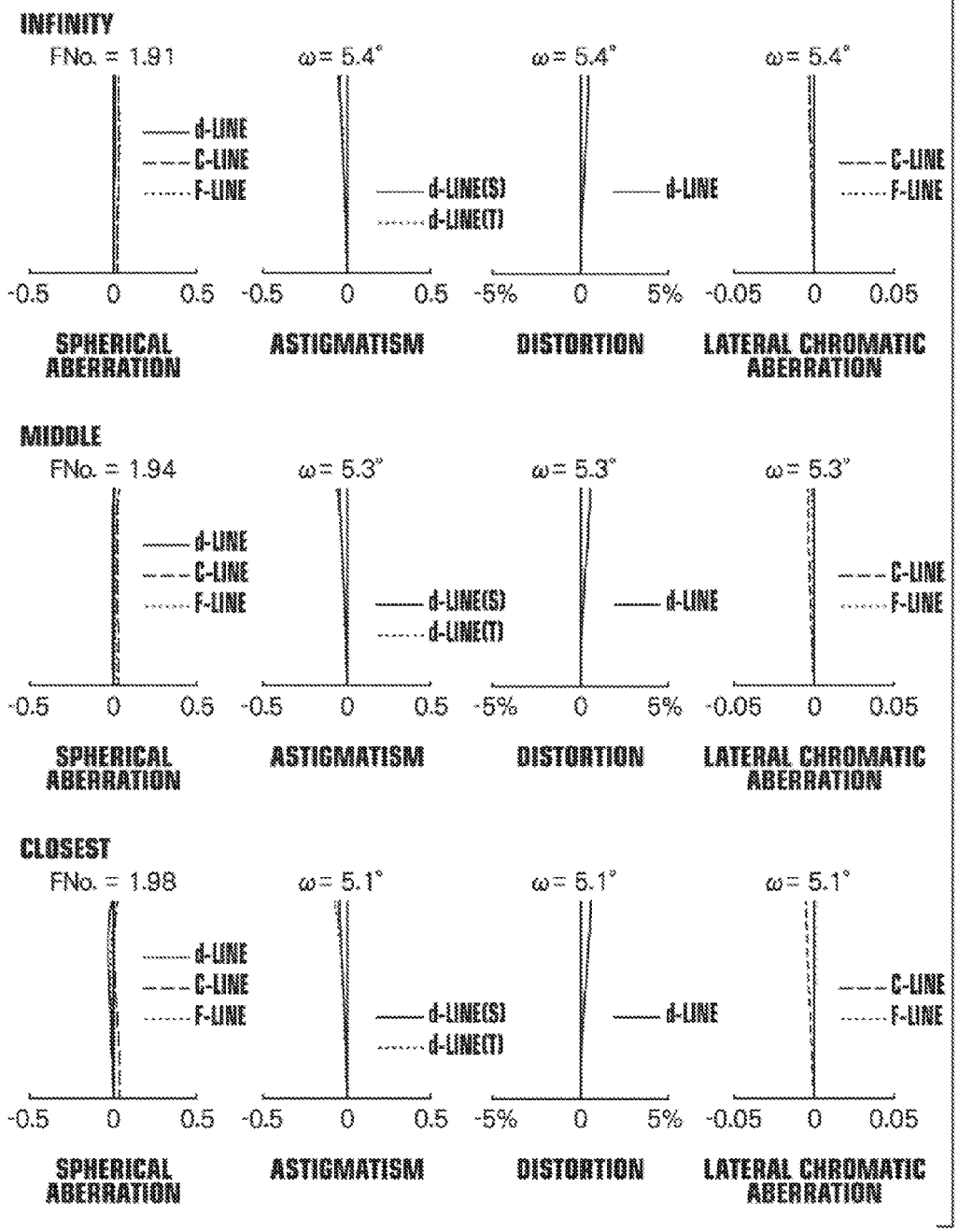

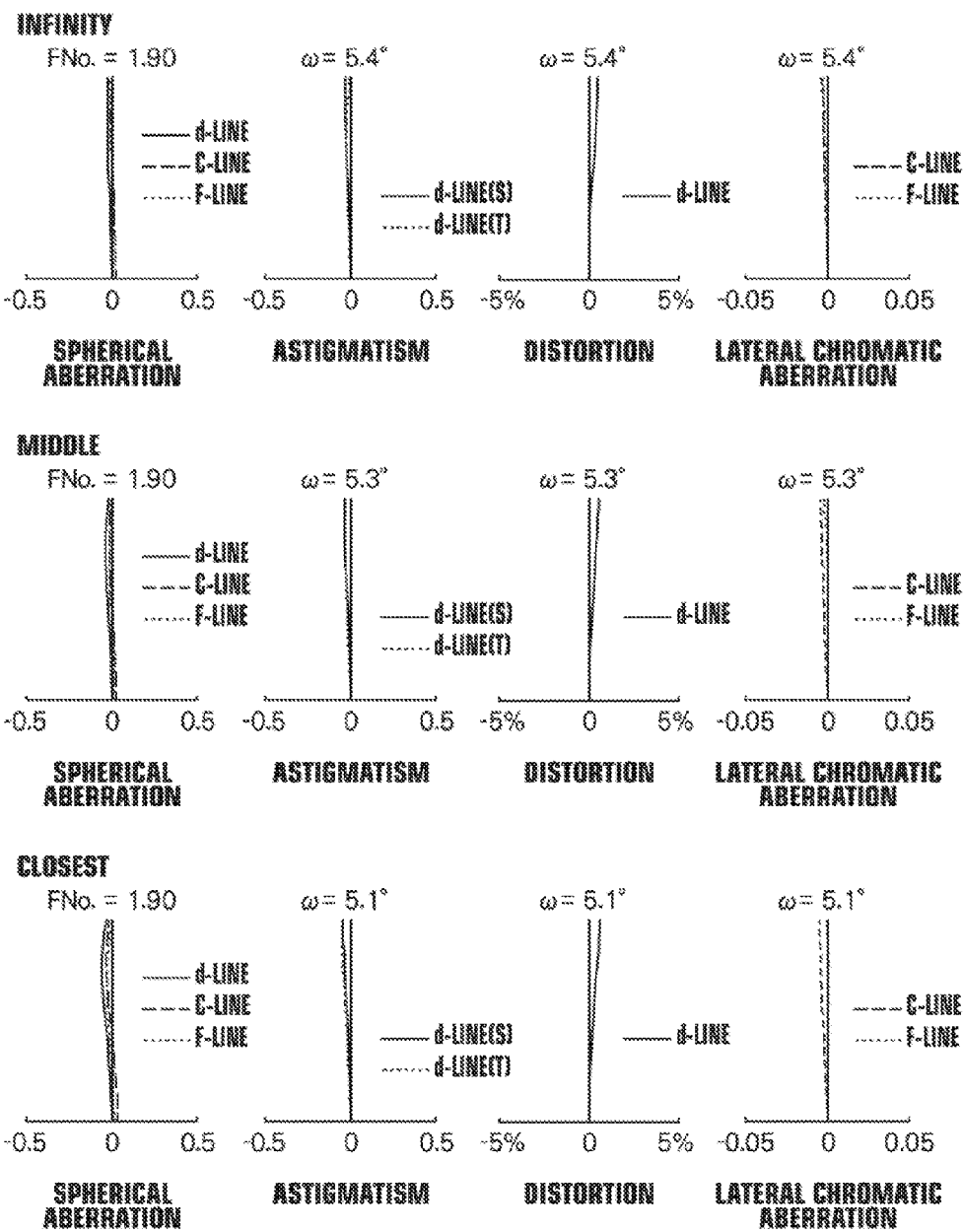

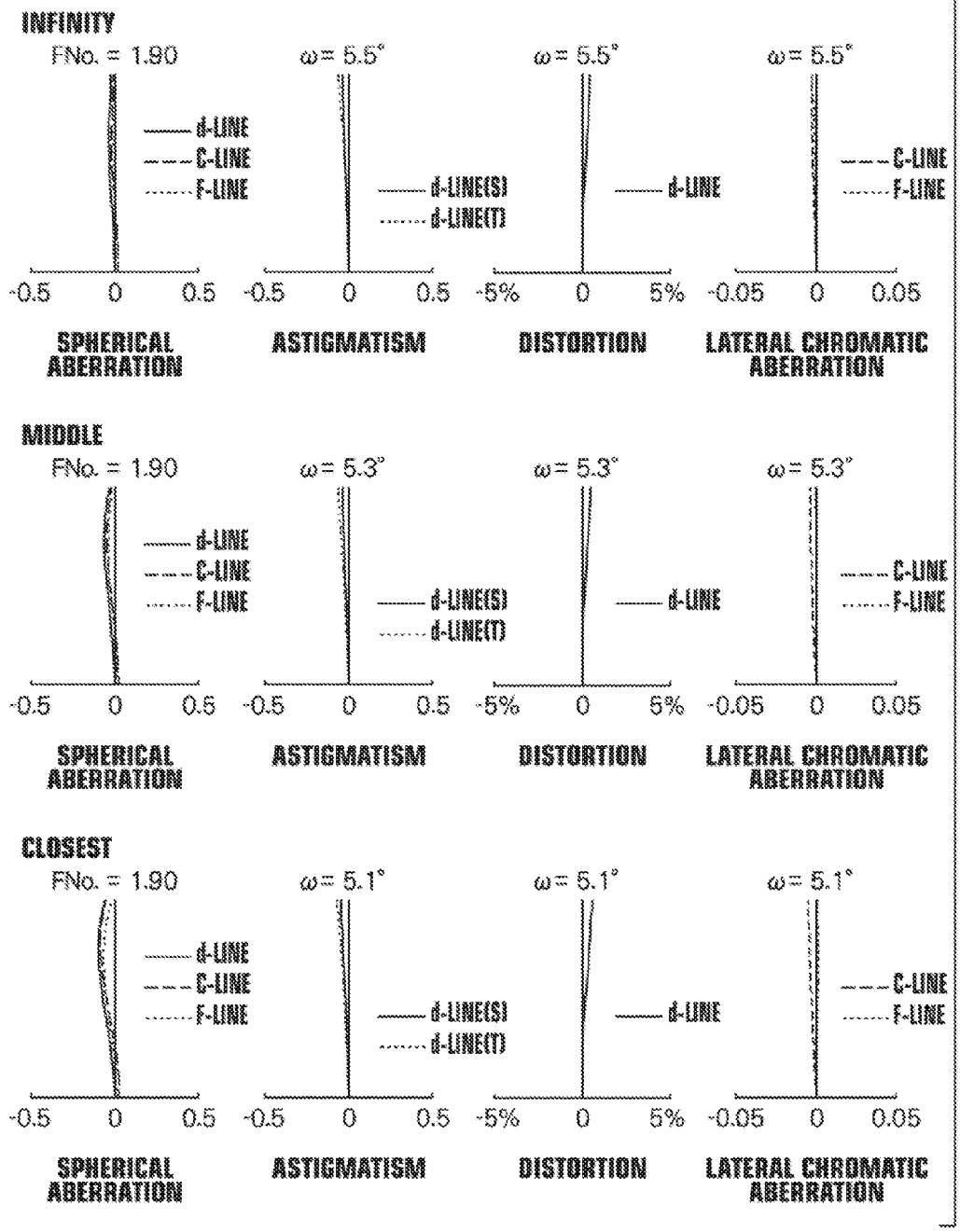

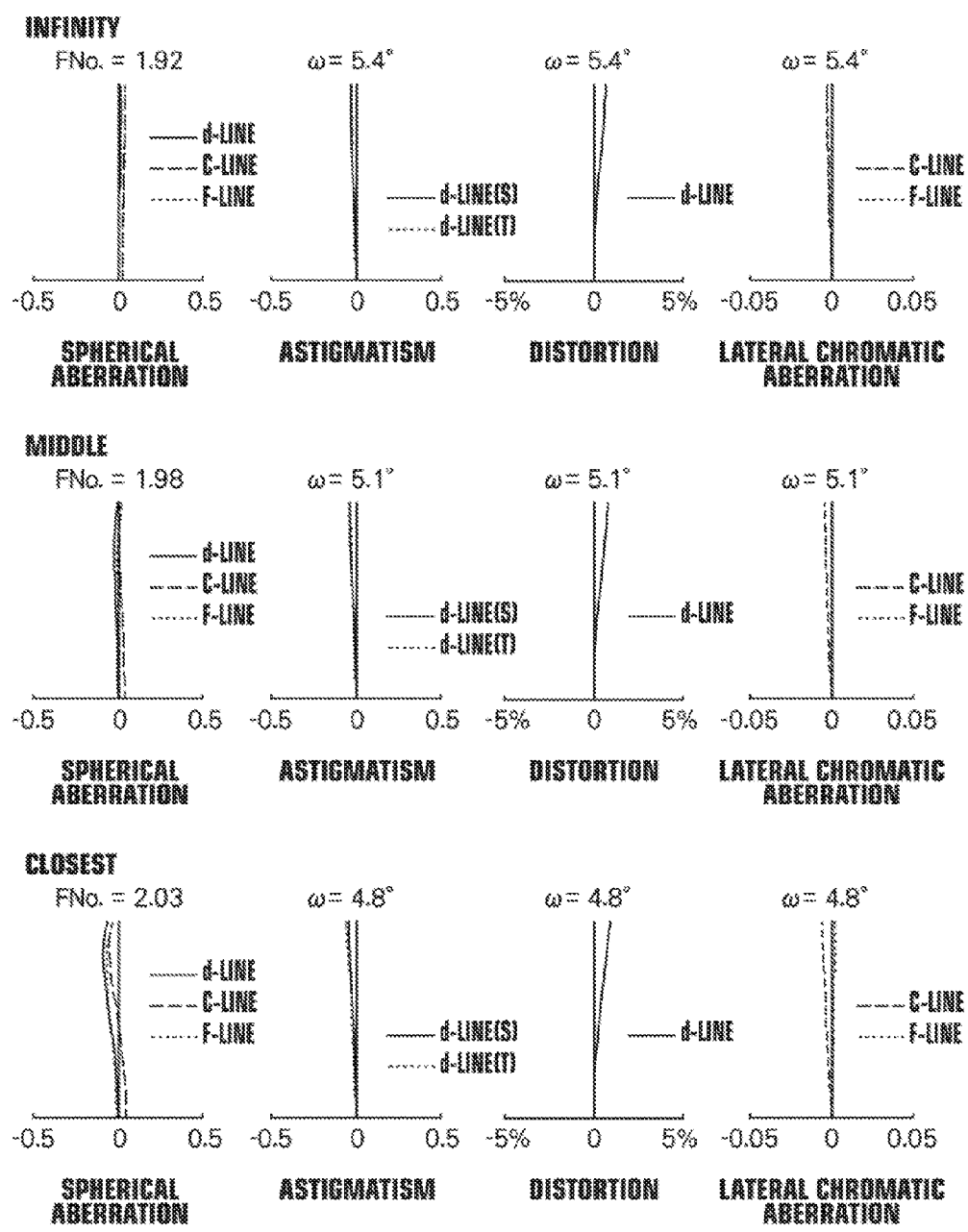

IMAGING LENS AND IMAGING APPARATUS

CROSS-REFERENCE TO RELATED APPLICATIONS

The present application claims priority under 35 U.S.C. §119 to Japanese Patent Application No. 2015-026071, filed on Feb. 13, 2015. The above application is hereby expressly incorporated by reference, in its entirety, into the present application.

BACKGROUND

The present disclosure relates to an imaging lens that is suitable for use with motion-picture cameras, broadcasting cameras, still cameras, video cameras, etc., and an imaging apparatus provided with the imaging lens.

Conventionally, as imaging lenses for use with cameras in the above-mentioned fields, imaging lenses employing an inner focus system where focusing is effected by moving a lens group forming a part of the intermediate portion of the lens system have been proposed. Comparing to a focusing system where the entire lens system is moved to effect focusing, the inner focus system is advantageous in enabling light and fast focusing operation and quick autofocus control. For example, each of Japanese Patent Nos. 5429244 and 4898408 (hereinafter, Patent Documents 1 and 2, respectively) teaches a lens system consisting of, in order from the object side, a first lens group having a positive refractive power, a second lens group having a negative refractive power, and a third lens group having a positive refractive power, and employing an inner focus system where the second lens group is moved to effect focusing.

SUMMARY

It is desired for cameras in the above-mentioned fields to have a small F-number so as to accommodate photographing at a dark location or various photographic expressions. However, a telephoto-type imaging lens that employs an inner focus system and has a small F-number, when attempted to be accomplished, tends to have large fluctuation of aberrations during focusing, making it difficult to keep good optical performance throughout the range of object distance from infinity to the closest object distance of the lens.

Patent Documents 1 and 2 teach lens systems having a F-number within the range from 1.8 to 2.05. However, the lens system taught in Patent Document 1 does not have aberrations sufficiently corrected. The lens system taught in Patent Document 2 needs further improvement of correction of spherical aberration and chromatic aberration in order to achieve a high-performance optical system as demanded in recent years.

In order to keep good optical performance for a wide range of object distance, one may consider increasing the number of lenses. However, this will lead to size increase of the lens system, which is not preferred.

In view of the above-described circumstances, the present disclosure is directed to providing an imaging lens that employs an inner focus system, has a small F-number, and is capable of keeping high optical performance for a wide range of object distance with successfully corrected fluctuation of aberrations during focusing, while reducing size increase of the lens system, as well as an imaging apparatus provided with the imaging lens.

An imaging lens of the disclosure consists of, in order from the object side, a first lens group having a positive refractive power, a second lens group having a negative refractive power, a stop, and a third lens group having a positive refractive power, wherein focusing is effected by moving only the second lens group along the optical axis direction, the first lens group comprises at least three positive lenses and at least two negative lenses, the second lens group comprises a negative lens, the third lens group comprises at least three positive lenses and at least two negative lenses, and the condition expression (1) below is satisfied:

$$0.53 < -f2/f < 0.9 \quad (1),$$

where f2 is a focal length of the second lens group, and f is a focal length of the entire system when the imaging lens is focused on an object at infinity.

It is preferred that the imaging lens of the disclosure satisfy any one of or any combination of the condition expressions (2) to (8), and (1-1) to (8-1) below:

$$66 < \nu n2 < 98 \quad (2),$$

$$0.2 < f1/f3 < 0.85 \quad (3),$$

$$0.1 < (R3r - R3f)/(R3r + R3f) < 0.5 \quad (4),$$

$$0.62 < f1/f < 1.2 \quad (5),$$

$$0.6 < f3/f < 2.3 \quad (6),$$

$$0.5 < -f1/f2 < 1.5 \quad (7),$$

$$1.5 < -f3/f2 < 4.5 \quad (8),$$

$$0.54 < -f2/f < 0.85 \quad (1-1),$$

$$67 < \nu n2 < 88 \quad (2-1),$$

$$0.3 < f1/f3 < 0.8 \quad (3-1),$$

$$0.15 < (R3r - R3f)/(R3r + R3f) < 0.45 \quad (4-1),$$

$$0.65 < f1/f < 1 \quad (5-1),$$

$$0.65 < f3/f < 1.9 \quad (6-1),$$

$$0.6 < -f1/f2 < 1.4 \quad (7-1),$$

$$1.6 < -f3/f2 < 4 \quad (8-1),$$

where $\nu n2$ is an Abbe number with respect to the d-line of the most image-side negative lens of the second lens group, f1 is a focal length of the first lens group, f2 is a focal length of the second lens group, f3 is a focal length of the third lens group, f is a focal length of the entire system when the imaging lens is focused on an object at infinity, $R3f$ is a radius of curvature of the object-side surface of the most image-side positive lens of the third lens group, and $R3r$ is a radius of curvature of the image-side surface of the most image-side positive lens of the third lens group.

In the imaging lens of the disclosure, it is preferred that the first lens group comprise a cemented lens formed by, in order from the object side, a biconvex lens and a biconcave lens that are cemented together.

In the imaging lens of the disclosure, the second lens group may consist of one negative lens, or the second lens group may consist of a cemented lens formed by one negative lens and one positive lens that are cemented together.

It should be noted that the expression "consisting/consist of" as used herein means "consisting/consist essentially of"

and that the imaging lens may include, besides the elements recited above: lenses substantially without any power; optical elements other than lenses, such as a stop, a cover glass, and filters; and mechanical components, such as a lens flange, a lens barrel, a camera shake correction mechanism, etc.

It should be noted that, with respect to any lens group or lens including an aspheric surface of the imaging lens of the disclosure, the sign (positive or negative) of the refractive power of the lens group, the sign of the refractive power of the lens, or the surface shape or the value of radius of curvature of the lens is about the paraxial region.

An imaging apparatus of the disclosure comprise the imaging lens of the disclosure.

The lens system according to the disclosure consists of, in order from the object side, a positive first lens group, a negative second lens group, a stop, and a positive third lens group, wherein only the second lens group is moved during focusing. This lens system is configured such that lenses of the first lens group and the third lens group are suitably configured, and the given condition expression is satisfied. This configuration allows providing an imaging lens that employs an inner focus system, has a small F-number, and is capable of keeping high optical performance for a wide range of object distance with successfully corrected fluctuation of aberrations during focusing, while reducing size increase of the lens system, as well as an imaging apparatus provided with the imaging lens.

BRIEF DESCRIPTION OF THE DRAWINGS

FIG. 1 is a sectional view illustrating the configuration of an imaging lens of Example 1 of the disclosure, FIG. 2 is a sectional view illustrating the configuration of an imaging lens of Example 2 of the disclosure, FIG. 3 is a sectional view illustrating the configuration of an imaging lens of Example 3 of the disclosure, FIG. 4 is a sectional view illustrating the configuration of an imaging lens of Example 4 of the disclosure, FIG. 5 is a sectional view illustrating the configuration of an imaging lens of Example 5 of the disclosure, FIG. 6 shows aberration diagrams of the imaging lens of Example 1 of the disclosure, showing spherical aberration, astigmatism, distortion, and lateral chromatic aberration in this order from the left, FIG. 7 shows aberration diagrams of the imaging lens of Example 2 of the disclosure, showing spherical aberration, astigmatism, distortion, and lateral chromatic aberration in this order from the left, FIG. 8 shows aberration diagrams of the imaging lens of Example 3 of the disclosure, showing spherical aberration, astigmatism, distortion, and lateral chromatic aberration in this order from the left, FIG. 9 shows aberration diagrams of the imaging lens of Example 4 of the disclosure, showing spherical aberration, astigmatism, distortion, and lateral chromatic aberration in this order from the left, FIG. 10 shows aberration diagrams of the imaging lens of Example 5 of the disclosure, showing spherical aberration, astigmatism, distortion, and lateral chromatic aberration in this order from the left.

DETAILED DESCRIPTION OF THE PREFERRED EMBODIMENTS

Figure 11:
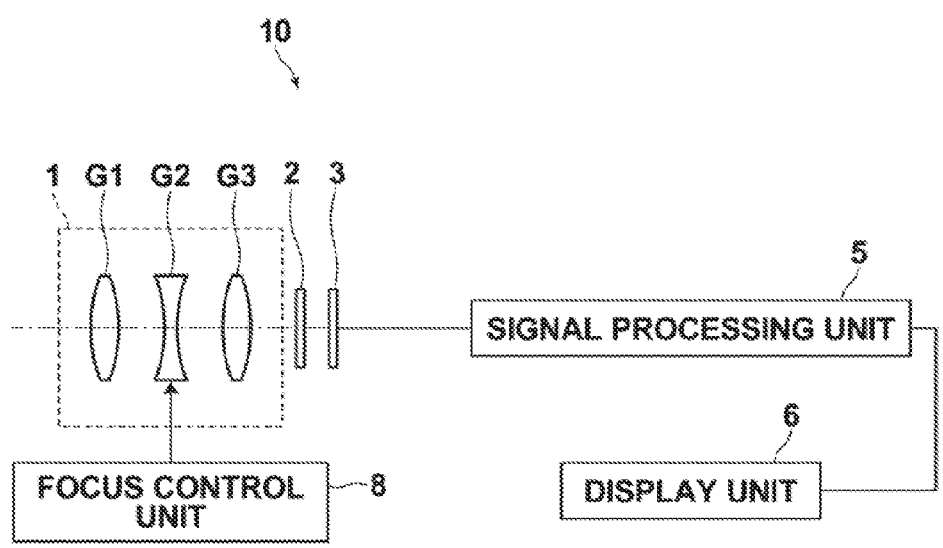
FIG. 11 is a schematic configuration diagram of an imaging apparatus according to one embodiment of the disclosure.

Hereinafter, embodiments of the disclosure will be described in detail with reference to the drawings. FIGS. 1 to 5 are sectional views showing the configurations of imaging lenses according to embodiments of the disclosure corresponding to Examples 1 to 5, which will be described later, respectively. In FIGS. 1 to 5, the left side is the object side and the right side is the image side, where the configurations shown are in the state where the imaging lens is focused on an object at infinity. The examples shown in FIGS. 1 to 5 have the same basic configuration and are shown in the drawings in the same manner, and therefore the following description is made mainly with reference to the configuration example shown in FIG. 1 as a representative configuration.

This imaging lens consists essentially of, in order from the object side along the optical axis Z, a first lens group G1 having a positive refractive power, a second lens group G2 having a negative refractive power, an aperture stop St, and a third lens group G3 having a positive refractive power. It should be noted that the aperture stop St shown in FIG. 1 does not necessarily represent the size and the shape thereof, but represents the position thereof along the optical axis Z.

This imaging lens is a lens system employing an inner focus system where focusing is effected by moving only the second lens group G2 along the optical axis direction. In the example shown in FIG. 1, the second lens group G2 is moved toward the image side when the imaging lens is focused from infinity to its closest object distance, and the direction of the movement of the second lens group G2 is shown by the arrow provided below the second lens group G2 shown in FIG. 1.

When this imaging lens is applied to an imaging apparatus, a cover glass, various filters, such as an infrared cut-off filter and a low-pass filter, etc., may be provided between the lens system and the image plane Sim, depending on the configuration of the imaging apparatus. In the example shown in FIG. 1, an optical member PP in the form of a plane-parallel plate, which is assumed to represent such elements, is disposed between the lens system and the image plane Sim. However, the position of the optical member PP is not limited to one shown in FIG. 1, or a configuration where the optical member PP is omitted is also possible.

Providing the first lens group G1 with a positive refractive power is advantageous for reducing the entire length of the lens system. The first lens group G1 includes at least three positive lenses and at least two negative lenses. This allows each of the at least three positive lenses to share a part of the positive refractive power of the first lens group G1, thereby allowing successful correction of spherical aberration while favorably reducing the entire length of the lens system, and this is advantageous for achieving a small F-number. Providing the at least two negative lenses is advantageous for successfully correcting chromatic aberration, astigmatism, and field curvature.

For example, as in the example shown in FIG. 1, the first lens group G1 may consist of five lenses which consists of, in order from the object side, a positive lens L11, a positive lens L12, a negative lens L13, a negative lens L14, and a positive lens L15. Alternatively, as in the examples shown in FIGS. 2 to 5, the first lens group G1 may consist of six lenses which consists of, in order from the object side, a positive lens L11, a positive lens L11b, a positive lens L12, a negative lens L13, a negative lens L14, and a positive lens L15. In the case where the above-described five-lens configuration or six-lens configuration is adopted, each of the lenses L11, L11b, and L12 can share a part of the positive refractive power of the first lens group G1, thereby allowing successful correction of spherical aberration while favorably reducing the entire length of the lens system, and this is advantageous for achieving a small F-number. Further, the lenses L13 and L14 allow successfully correcting longitudinal chromatic aberration, lateral chromatic aberration, astigmatism, and field curvature, and the lens L15 also shares a part of the positive refractive power of the first lens group G1 to allow favorably reducing the entire length of the lens system. Further, in the case where the above-described five-lens configuration or six-lens configuration is adopted, the lens L12 and the lens L13 may be cemented together, and the lens L14 and the lens L15 may be cemented together.

The first lens group G1 preferably includes a cemented lens formed by, in order from the object side, a biconvex lens and a biconcave lens that are cemented together. This allows successfully correcting chromatic aberration.

The second lens group G2 includes at least one negative lens. The second lens group G2 is an only lens group having a negative refractive power among the three lens groups. Using the second lens group G2 as a focusing group which is moved during focusing allows reducing the amount of movement of the focusing group during focusing, thereby allowing reducing the entire length of the lens system.

The second lens group G2 may consist of one lens component. This allows simplifying the mechanism for moving the focusing group. The "lens component" as used herein refers to a lens where only two surfaces, i.e., the object-side surface and the image-side surface, are in contact with air along the optical axis, and "one lens component" as used herein refers to one single lens or one cemented lens.

Specifically, as in the examples shown in FIGS. 1, 2, and 5, for example, the second lens group G2 may consist essentially of a cemented lens that is formed by one positive lens L2$p$ and one negative lens L2$n$ cemented together. This configuration facilitates correction of chromatic aberration and spherical aberration during focusing, and also allows weight reduction of the focusing group. Alternatively, the second lens group G2 may consist essentially of one negative lens L2$n$, as in the examples shown in FIGS. 3, and 4. This configuration facilitates correction of spherical aberration during focusing, and also allows weight reduction of the focusing group. Reducing the weight of the focusing group is effective in a telephoto-type optical system, where the lens system tends to be heavy.

The third lens group G3 is a lens group having a positive refractive power. This allows reducing the effective diameters of the lenses of the first lens group G1 to allow size reduction of the lens system, and is advantageous for correction of aberrations. The third lens group G3 includes at least three positive lenses and at least two negative lenses. Each of the at least three positive lenses can share a part of the positive refractive power of the third lens group G3, thereby allowing successful correction of spherical aberration while favorably reducing the entire length of the lens system, and this is advantageous for achieving a small F-number. Providing the at least two negative lenses is advantageous for successfully correcting chromatic aberration, astigmatism, and field curvature.

For example, as in the examples shown in FIGS. 1 to 3 and 5, the third lens group G3 may consist of five lenses consisting of, in order from the object side, a negative lens L31, a positive lens L32, a positive lens L33, a negative lens L34, and a positive lens L35. Alternatively, as in the example shown in FIG. 4, the third lens group G3 may consist of six lenses consisting of, in order from the object side, a negative lens L31, a positive lens L32, a positive lens L33, a negative lens L34, a negative lens L34$b$, and a positive lens L35. In the case where the above-described five-lens configuration or six-lens configuration is adopted, the lens L31 allows successful correction of astigmatism, field curvature, and chromatic aberration, the lens L32 allows reducing effective diameters of the lenses of the first lens group G1 while favorably reducing the entire length of the lens system to allow size reduction of the lens system, each of the lenses L33, L34, and L34$b$ allows successful correction of astigmatism, field curvature, and chromatic aberration, and the lens L35 allows reducing effective diameters of the lenses of the first lens group G1 to allow size reduction of the lens system. Further, in the case where the above-described five-lens configuration or six-lens configuration is adopted, the lens L31 and the lens L32 may be cemented together, and the lens L33 and the lens L34 may be cemented together.

It should be noted that, in the case where the third lens group G3 adopts the above-described five-lens configuration or six-lens configuration, vibration compensation may be performed by moving the lens L33 and the lens L34 together in directions perpendicular to the optical axis to shift the position of the image. In this case, only a small amount of movement of the lens L33 and the lens L34 can provide a large amount of shift of the image position in the image plane Sim, and this allows ensuring good image performance while achieving size reduction of the apparatus.

This imaging lens satisfies the condition expression (1) below:

$$0.53 < -f2/f < 0.9 \tag{1},$$

where f2 is a focal length of the second lens group, and f is a focal length of the entire system when the imaging lens is focused on an object at infinity.

Setting the value of −f2/f such that it does not become equal to or smaller than the lower limit of condition expression (1) allows keeping the refractive power of the second lens group G2 sufficiently small, and this facilitates correction of longitudinal chromatic aberration. Also, setting the value of −f2/f such that it does not become equal to or smaller than the lower limit of condition expression (1) allows preventing over correction of spherical aberration when the imaging lens is focused on a close object, and this allows suppressing fluctuation of spherical aberration and astigmatism in a well-balanced manner when the imaging lens is focused from infinity to a close object distance. Setting the value of −f2/f such that it does not become equal to or greater than the upper limit of condition expression (1) allows keeping the refractive power of the second lens group G2 sufficiently large to reduce the amount of movement the second lens group G2 during focusing, and this contributes to reduction of the entire length of the lens system.

In order to enhance the advantageous effects with respect to condition expression (1), it is preferred to satisfy the condition expression (1-1) below, and it is more preferred to satisfy the condition expression (1-2) below:

$$0.54 < -f2/f < 0.85 \tag{1-1}$$

$$0.62 < -f2/f < 0.85 \tag{1-2}.$$

It is preferred that the imaging lens satisfy any one of or any combination of the condition expressions (2) to (8) below:

$$66 < vn2 < 98 \tag{2},$$

$$0.2 < f1/f3 < 0.85 \tag{3},$$

$$0.1 < (R3r - R3f)/(R3r + R3f) < 0.5 \tag{4},$$

$$0.62 \le f1/f < 1.2 \tag{5},$$

$$0.6 < f3/f < 2.3 \tag{6}$$

$$0.5 < -f1/f2 < 1.5 \tag{7}$$

$$1.5 < -f3/f2 < 4.5 \tag{8}$$

where νn2 is an Abbe number with respect to the d-line of the most image-side negative lens of the second lens group, f1 is a focal length of the first lens group, f3 is a focal length of the third lens group, f is a focal length of the entire system when the imaging lens is focused on an object at infinity, R3f is a radius of curvature of the object-side surface of the most image-side positive lens of the third lens group, and R3r is a radius of curvature of the image-side surface of the most image-side positive lens of the third lens group.

Setting the value of νn2 such that it does not become equal to or smaller than the lower limit of condition expression (2) facilitates correction of longitudinal chromatic aberration during focusing. Setting the value of νn2 such that it does not become equal to or greater than the upper limit of condition expression (2) facilitates correction of chromatic aberration, in particular, lateral chromatic aberration, during focusing.

Setting the value of f1/f3 such that it does not become equal to or smaller than the lower limit of condition expression (3) allows preventing the refractive power of the first lens group G1 from becoming excessively strong, and this allows suppressing astigmatism and field curvature. Alternatively, this allows preventing the refractive power of the third lens group G3 from becoming excessively weak, and this contributes to reduction of the entire length of the lens system. Setting the value of f1/f3 such that it does not become equal to or greater than the upper limit of condition expression (3) allows preventing the refractive power of the first lens group G1 from becoming excessively weak, thereby allowing reducing the effective diameters of the lenses of the first lens group G1, and achieving size reduction of the lens system. Alternatively, this allows preventing the refractive power of the third lens group G3 from becoming excessively strong, and this allows providing a sufficient backfocus.

Setting the value of (R3r−R3f)/(R3r+R3f) such that it does not become equal to or smaller than the lower limit of condition expression (4) allows suppressing spherical aberration. Setting the value of (R3r−R3f)/(R3r+R3f) such that it does not become equal to or greater than the upper limit of condition expression (4) allows suppressing field curvature.

Setting the value of f1/f such that it does not become equal to or smaller than the lower limit of condition expression (5) allows preventing the refractive power of the first lens group G1 from becoming excessively strong, and this allows suppressing astigmatism and field curvature. Setting the value of f1/f such that it does not become equal to or greater than the upper limit of condition expression (5) allows preventing the refractive power of the first lens group G1 from becoming excessively weak, and this contributes to reduction of the entire length of the lens system.

Setting the value of f3/f such that it does not become equal to or smaller than the lower limit of condition expression (6) allows preventing the refractive power of the third lens group G3 from becoming excessively strong, and this allows suppressing spherical aberration, or providing a sufficient backfocus. Setting the value of f3/f such that it does not become equal to or greater than the upper limit of condition expression (6) allows preventing the refractive power of the third lens group G3 from becoming excessively weak, and this contributes to reduction of the entire length of the lens system.

Satisfying condition expressions (5) and (6) at the same time facilitates successful correction of aberrations while reducing the entire length of the lens system.

Setting the value of −f1/f2 such that it does not become equal to or smaller than the lower limit of condition expression (7) allows preventing the refractive power of the first lens group G1 from becoming excessively strong, and allows preventing the refractive power of the second lens group G2 from becoming excessively weak, and this allows successful correction of spherical aberration, in particular, spherical aberration that occurs when the imaging lens is focused on a close object. Setting the value of −f1/f2 such that it does not become equal to or greater than the upper limit of condition expression (7) allows preventing the refractive power of the first lens group G1 from becoming excessively weak, and allows preventing the refractive power of the second lens group G2 from becoming excessively strong, and this allows avoiding over correction of spherical aberration.

Setting the value of −f3/f2 such that it does not become equal to or smaller than the lower limit of condition expression (8) allows preventing the refractive power of the third lens group G3 from becoming excessively strong, and allows preventing the refractive power of the second lens group G2 from becoming excessively weak, and this allows successfully correcting spherical aberration and providing a sufficient backfocus. Setting the value of −f3/f2 such that it does not become equal to or greater than the upper limit of condition expression (8) allows preventing the refractive power of the third lens group G3 from becoming excessively weak, and allows preventing the refractive power of the second lens group G2 from becoming excessively strong, and this contributes to reduction of the entire length of the lens system, or allows suppressing spherical aberration and longitudinal chromatic aberration.

Satisfying condition expressions (7) and (8) at the same time facilitates successfully correcting spherical aberration, and this is advantageous for achieving a small F-number.

In order to enhance the advantageous effects with respect to the condition expressions (2) to (8) above, it is more preferred to satisfy the condition expressions (2-1) to (8-1) below in place of the condition expressions (2) to (8), respectively:

$$67 < \nu n2 < 88 \tag{2-1}$$

$$0.3 < f1/f3 < 0.8 \tag{3-1}$$

$$0.15 < (R3r-R3f)/(R3r+R3f) < 0.45 \tag{4-1}$$

$$0.65 < f1/f < 1 \tag{5-1}$$

$$0.65 < f3/f < 1.9 \tag{6-1}$$

$$0.6 < -f1/f2 < 1.4 \tag{7-1}$$

$$1.6 < -f3/f2 < 4 \tag{8-1}$$

The preferred configurations and possible configurations described above can be combined in any manner, and are preferably adopted in a selective manner depending on the required specifications. For example, the above-described configurations can be adopted as appropriate to form an imaging lens that employs an inner focus system, has a small F-number, and allows keeping high optical performance for a wide range of object distance with successfully corrected fluctuation of aberrations during focusing, while reducing size increase of the lens system. It should be noted that "a small F-number" as used herein refers to an F-number of 2.0 or less in the state where the imaging lens is focused on an object at infinity.

Next, numerical examples of the imaging lens of the disclosure are described. Values shown in Examples 1 to 5 below are normalized such that the focal length of the entire system when the imaging lens is focused on an object at infinity is 100.0.

Example 1

The configuration diagram of the imaging lens of Example 1 is shown in FIG. 1. The imaging lens of Example 1 consists of, in order from the object side, a first lens group G1, a second lens group G2, an aperture stop St, and a third lens group G3. The focusing group includes only the second lens group G2, where the second lens group G2 is moved toward the image side when the imaging lens is focused from infinity to its closest object distance. The first lens group G1 consists of five lenses consisting of lenses L11 to L15 in this order from the object side, the second lens group G2 consists of two lenses consisting of lenses L2p and L2n in this order from the object side, and the third lens group G3 consists of five lenses consisting of lenses L31 to L35 in this order from the object side.

Table 1 shows basic lens data of the imaging lens of Example 1, and Table 2 shows specifications and values of variable surface distances of the imaging lens. In Table 1, each value in the column of "Si" represents the surface number of the i-th (where i=1, 2, 3, . . . ) surface, where the object-side surface of the most object-side element is the 1st surface and the number is sequentially incremented toward the image side, each value in the column of "Ri" represents the radius of curvature of the i-th surface, and each value in the column of "Di" represents the surface distance between the i-th surface and the i+1-th surface along the optical axis Z. The sign with respect to the radius of curvature is provided such that a positive radius of curvature indicates a surface shape that is convex toward the object side, and a negative radius of curvature indicates a surface shape that is convex toward the image side.

Further, in Table 1, each value in the column of "Ndj" represents the refractive index with respect to the d-line (the wavelength of 587.6 nm) of the j-th (where j=1, 2, 3, . . . ) optical element, where the most object-side element is the 1st element and the number is sequentially incremented toward the image side, and each value in the column of "vdj" represents the Abbe number with respect to the d-line of the j-th optical element. Table 1 also shows the aperture stop St, the optical member PP, and the image plane Sim. In Table 1, the surface number and the text "(St)" are shown at the position in the column of the surface number corresponding to the aperture stop St, and the surface number and the text "(Sim)" are shown at the position in the column of the surface number corresponding to the image plane Sim. Further, in Table 1, the value of each variable surface distance that is changed during focusing is represented by the symbol "DD[ ]", where the surface number of the object-side surface corresponding to each surface distance is shown within "[ ]."

Table 2 shows values of lateral magnification β, focal length f' of the entire system, F-number FNo., full angle of view 2ω, and variable surface distances, which values are with respect to the d-line. The symbol IT shown next to "2ω" means that the unit is "degrees". In Table 2, values in the states where the imaging lens is focused on an object at infinity, where the imaging lens is focused on the middle position, and where the imaging lens is focused on an object at the closest object distance of the lens are shown in the columns denoted by "Infinity", "Middle", and "Closest", respectively. It should be noted that the numerical values shown in the tables below are rounded at predetermined decimal places.

TABLE 1

Example 1

| Si | Ri | Di | Ndj | vdj |
|---|---|---|---|---|
| 1 | 400.3424 | 6.7438 | 1.48749 | 70.24 |
| 2 | −168.2879 | 0.3929 | | |
| 3 | 61.6551 | 10.2699 | 1.43875 | 94.94 |
| 4 | −136.3968 | 1.7393 | 1.80610 | 40.93 |
| 5 | 496.9335 | 1.4187 | | |
| 6 | 46.2150 | 7.6391 | 1.81600 | 46.62 |
| 7 | 30.1158 | 8.3276 | 1.49700 | 81.54 |
| 8 | 514.9436 | DD[8] | | |
| 9 | −210.8993 | 2.7831 | 1.84666 | 23.88 |
| 10 | −106.8861 | 5.8171 | 1.59522 | 67.73 |
| 11 | 36.5648 | DD[11] | | |
| 12(St) | ∞ | 1.6665 | | |
| 13 | 31.9856 | 6.1569 | 1.88300 | 40.76 |
| 14 | 21.3768 | 8.1740 | 1.59522 | 67.73 |
| 15 | −100.3293 | 2.1109 | | |
| 16 | 52.7420 | 4.8045 | 1.84666 | 23.88 |
| 17 | 105.3092 | 8.0876 | 1.88300 | 40.76 |
| 18 | 16.3508 | 8.3325 | | |
| 19 | 19.7037 | 8.3324 | 1.48749 | 70.24 |
| 20 | 41.1981 | 12.6433 | | |
| 21 | ∞ | 1.1110 | 1.51633 | 64.14 |
| 22 | ∞ | 4.0962 | | |
| 23(Sim) | ∞ | | | |

TABLE 2

Example 1

| | Infinity | Middle | Closest |
|---|---|---|---|
| β | 0.00 | −0.02 | −0.05 |
| f' | 100.0 | 97.48 | 94.90 |
| FNo. | 1.93 | 1.97 | 2.01 |
| 2ω[°] | 10.8 | 10.6 | 10.2 |
| DD[8] | 2.29 | 3.65 | 5.07 |
| DD[11] | 10.41 | 9.04 | 7.63 |

FIG. 6 shows aberration diagrams of the imaging lens of Example 1. At the top of FIG. 6, spherical aberration, astigmatism, distortion, and lateral chromatic aberration (magnification chromatic aberration) when the imaging lens is focused on an object at infinity are shown in this order from the left. At the middle of FIG. 6, spherical aberration, astigmatism, distortion, and lateral chromatic aberration when the imaging lens is focused on an object at the middle position are shown in this order from the left. At the bottom of FIG. 6, spherical aberration, astigmatism, distortion, and lateral chromatic aberration when the imaging lens is focused on an object at the closest object distance of the lens are shown in this order from the left. In the diagrams showing spherical aberration, aberrations with respect to the d-line (the wavelength of 587.6 nm), the C-line (the wavelength of 656.3 nm), and the F-line (the wavelength of 486.1 nm) are shown in the black solid line, the long dashed line, and the short dashed line, respectively. In the diagrams showing astigmatism, aberrations in the sagittal direction and the tangential direction with respect to the d-line are shown in the solid line and the short dashed line, respectively, as denoted by the symbols "(S)" and "(T)" in the explanation of the line types. In the diagrams showing distortion, aberrations with respect to the d-line are shown in the solid line. In the diagrams showing lateral chromatic aberration, aberrations with respect to the C-line and the F-line are shown in the long dashed line and the short dashed line, respectively. The symbol "FNo." in the diagrams showing spherical aberration means "F-number", and the symbol "ω" in the other aberration diagrams means "half angle of view".

The symbols, the meanings, and the manners of description of the data explained above with respect to Example 1 also apply to the other examples described below, unless otherwise noted, and the same explanations are not repeated below.

Example 2

The configuration diagram of the imaging lens of Example 2 is shown in FIG. 2. The imaging lens of Example 2 consists of, in order from the object side, a first lens group G1, a second lens group G2, an aperture stop St, and a third lens group G3. The focusing group includes only the second lens group G2, where the second lens group G2 is moved toward the image side when the imaging lens is focused from infinity to its closest object distance. The first lens group G1 consists of six lenses consisting of lenses L11, L11b, and L12 to L15 in this order from the object side, the second lens group G2 consists of two lenses consisting of lenses L2p and L2n in this order from the object side, and the third lens group G3 consists of five lenses consisting of lenses L31 to L35 in this order from the object side. Table 3 shows basic lens data of the imaging lens of Example 2, and Table 4 shows specifications and values of variable surface distances of the imaging lens. FIG. 7 shows aberration diagrams of the imaging lens of Example 2.

TABLE 3

Example 2

| Si | Ri | Di | Ndj | vdj |
|---|---|---|---|---|
| 1 | 162.0569 | 4.1037 | 1.48749 | 70.24 |
| 2 | −824.4278 | 0.0556 | | |
| 3 | 69.3059 | 6.7493 | 1.48749 | 70.24 |
| 4 | 412.4028 | 0.3933 | | |
| 5 | 66.2963 | 8.0791 | 1.49700 | 81.54 |
| 6 | −177.8554 | 2.7833 | 1.78800 | 47.37 |
| 7 | 100.5520 | 1.2652 | | |
| 8 | 52.1313 | 3.2997 | 1.78800 | 47.37 |
| 9 | 32.5626 | 8.3394 | 1.49700 | 81.54 |
| 10 | 2249.8073 | DD[10] | | |
| 11 | −185.5510 | 5.3523 | 1.92286 | 18.90 |
| 12 | −116.8106 | 4.0497 | 1.48749 | 70.24 |
| 13 | 30.8514 | DD[13] | | |
| 14(St) | ∞ | 0.1501 | | |
| 15 | 34.6128 | 2.2294 | 1.88300 | 40.76 |
| 16 | 25.4105 | 6.2478 | 1.59522 | 67.73 |
| 17 | −83.0447 | 2.1126 | | |
| 18 | 82.5951 | 8.1978 | 1.84666 | 23.88 |
| 19 | 131.9355 | 4.3777 | 1.74400 | 44.79 |
| 20 | 16.9566 | 8.3394 | | |
| 21 | 19.6778 | 7.8486 | 1.49700 | 81.54 |
| 22 | 37.4682 | 12.6535 | | |
| 23 | ∞ | 1.1119 | 1.51633 | 64.14 |
| 24 | ∞ | 3.3577 | | |
| 25(Sim) | ∞ | | | |

TABLE 4

Example 2

| | Infinity | Middle | Closest |
|---|---|---|---|
| β | 0.00 | −0.02 | −0.03 |
| f | 100.0 | 97.42 | 94.79 |
| FNo. | 1.91 | 1.94 | 1.98 |
| 2ω[°] | 10.8 | 10.6 | 10.2 |
| DD[10] | 5.53 | 6.99 | 8.50 |
| DD[13] | 11.81 | 10.35 | 8.83 |

Example 3

The configuration diagram of the imaging lens of Example 3 is shown in FIG. 3. The imaging lens of Example 3 consists of, in order from the object side, a first lens group G1, a second lens group G2, an aperture stop St, and a third lens group G3. The focusing group includes only the second lens group G2, where the second lens group G2 is moved toward the image side when the imaging lens is focused from infinity to its closest object distance. The first lens group G1 consists of six lenses consisting of lenses L11, L11b, and L12 to L15 in this order from the object side, the second lens group G2 consists only of a lens L2n, and the third lens group G3 consists of five lenses consisting of lenses L31 to L35 in this order from the object side. Table 5 shows basic lens data of the imaging lens of Example 3, and Table 6 shows specifications and values of variable surface distances of the imaging lens. FIG. 8 shows aberration diagrams of the imaging lens of Example 3.

TABLE 5

Example 3

| Si | Ri | Di | Ndj | vdj |
|---|---|---|---|---|
| 1 | 78.9995 | 6.7523 | 1.48749 | 70.24 |
| 2 | 297.4701 | 0.0555 | | |
| 3 | 100.9196 | 6.7584 | 1.84666 | 23.78 |
| 4 | 958.4680 | 0.3938 | | |
| 5 | 52.4120 | 10.6602 | 1.49700 | 81.54 |
| 6 | −236.6176 | 3.8971 | 1.95375 | 32.32 |
| 7 | 107.3771 | 2.0990 | | |
| 8 | 88.4282 | 3.2539 | 1.80518 | 25.42 |
| 9 | 35.2729 | 7.1969 | 1.53775 | 74.70 |
| 10 | 525.8297 | DD[10] | | |
| 11 | −937.0024 | 3.4880 | 1.49700 | 81.54 |
| 12 | 39.0050 | DD[12] | | |
| 13(St) | ∞ | 0.4407 | | |
| 14 | 46.9427 | 3.9251 | 1.78470 | 26.29 |
| 15 | 23.2143 | 6.6928 | 1.53775 | 74.70 |
| 16 | −133.1981 | 2.1155 | | |
| 17 | 90.2737 | 5.5514 | 1.92286 | 18.90 |
| 18 | −31.7692 | 8.1193 | 1.76182 | 26.52 |
| 19 | 19.9274 | 8.3507 | | |
| 20 | 23.1865 | 8.3507 | 1.68893 | 31.07 |
| 21 | 39.8334 | 12.6706 | | |
| 22 | ∞ | 1.1134 | 1.51633 | 64.14 |
| 23 | ∞ | 3.2942 | | |
| 24(Sim) | ∞ | | | |

TABLE 6

Example 3

| | Infinity | Middle | Closest |
|---|---|---|---|
| β | 0.00 | −0.01 | −0.02 |
| f | 100.0 | 97.56 | 95.07 |

TABLE 6-continued

| | Example 3 | | |
|---|---|---|---|
| | Infinity | Middle | Closest |
| FNo. | 1.90 | 1.90 | 1.90 |
| 2ω[°] | 10.8 | 10.6 | 10.2 |
| DD[10] | 1.12 | 2.90 | 4.77 |
| DD[12] | 12.27 | 10.49 | 8.62 |

Example 4

The configuration diagram of the imaging lens of Example 4 is shown in FIG. 4. The imaging lens of Example 4 consists of, in order from the object side, a first lens group G1, a second lens group G2, an aperture stop St, and a third lens group G3. The focusing group includes only the second lens group G2, where the second lens group G2 is moved toward the image side when the imaging lens is focused from infinity to its closest object distance. The first lens group G1 consists of six lenses consisting of lenses L11, L11b, and L12 to L15 in this order from the object side, the second lens group G2 consists only of a lens L2n, and the third lens group G3 consists of six lenses consisting of lenses L31 to L34, L34b, and L35 in this order from the object side. Table 7 shows basic lens data of the imaging lens of Example 4, and Table 8 shows specifications and values of variable surface distances of the imaging lens. FIG. 9 shows aberration diagrams of the imaging lens of Example 4.

TABLE 7

| | Example 4 | | | |
|---|---|---|---|---|
| Si | Ri | Di | Ndj | νdj |
| 1 | 75.7038 | 4.6287 | 1.48749 | 70.24 |
| 2 | 165.6445 | 0.5569 | | |
| 3 | 102.3409 | 6.7598 | 1.84666 | 23.78 |
| 4 | 1139.6874 | 0.3939 | | |
| 5 | 48.1118 | 10.2518 | 1.49700 | 81.54 |
| 6 | −206.4169 | 3.8979 | 1.95375 | 32.32 |
| 7 | 115.1095 | 2.1361 | | |
| 8 | 85.6576 | 3.1884 | 1.80518 | 25.42 |
| 9 | 35.7581 | 6.5044 | 1.53775 | 74.70 |
| 10 | 811.1627 | DD[10] | | |
| 11 | −800.9298 | 2.7840 | 1.49700 | 81.54 |
| 12 | 34.7658 | DD[12] | | |
| 13(St) | ∞ | 0.0556 | | |
| 14 | 49.8608 | 2.2329 | 1.78470 | 26.29 |
| 15 | 22.7573 | 6.7512 | 1.53775 | 74.70 |
| 16 | −104.9717 | 2.1159 | | |
| 17 | 93.1483 | 5.7744 | 1.92286 | 18.90 |
| 18 | −27.9290 | 7.3129 | 1.76182 | 26.52 |
| 19 | 450.2841 | 0.8896 | | |
| 20 | −2701.4944 | 6.3205 | 1.80518 | 25.42 |
| 21 | 20.9025 | 6.5929 | | |
| 22 | 22.7752 | 8.3257 | 1.62588 | 35.70 |
| 23 | 44.4258 | 12.6732 | | |
| 24 | ∞ | 1.1136 | 1.51633 | 64.14 |
| 25 | ∞ | 3.6881 | | |
| 26(Sim) | ∞ | | | |

TABLE 8

| | Example 4 | | |
|---|---|---|---|
| | Infinity | Middle | Closest |
| β | 0.00 | −0.01 | −0.03 |
| f | 100.0 | 97.36 | 94.70 |

TABLE 8-continued

| | Example 4 | | |
|---|---|---|---|
| | Infinity | Middle | Closest |
| FNo. | 1.90 | 1.90 | 1.90 |
| 2ω[°] | 11.0 | 10.6 | 10.2 |
| DD[10] | 1.05 | 2.59 | 4.19 |
| DD[12] | 12.71 | 11.17 | 9.57 |

Example 5

The configuration diagram of the imaging lens of Example 5 is shown in FIG. 5. The imaging lens of Example 5 consists of, in order from the object side, a first lens group G1, a second lens group G2, an aperture stop St, and a third lens group G3. The focusing group includes only the second lens group G2, where the second lens group G2 is moved toward the image side when the imaging lens is focused from infinity to its closest object distance. The first lens group G1 consists of six lenses consisting of lenses L11, L11b, and L12 to L15 in this order from the object side, the second lens group G2 consists of two lenses consisting of lenses L2p and L2n in this order from the object side, and the third lens group G3 consists of five lenses consisting of lenses L31 to L35 in this order from the object side. Table 9 shows basic lens data of the imaging lens of Example 5, and Table 10 shows specifications and values of variable surface distances of the imaging lens. FIG. 10 shows aberration diagrams of the imaging lens of Example 5.

TABLE 9

| | Example 5 | | | |
|---|---|---|---|---|
| Si | Ri | Di | Ndj | νdj |
| 1 | 383.0355 | 3.6110 | 1.48749 | 70.24 |
| 2 | −310.9583 | 0.0556 | | |
| 3 | 76.4886 | 6.7446 | 1.48749 | 70.24 |
| 4 | 499.1253 | 0.3930 | | |
| 5 | 58.9244 | 8.6694 | 1.49700 | 81.54 |
| 6 | −169.4609 | 2.7778 | 1.78800 | 47.37 |
| 7 | 98.3216 | 1.3340 | | |
| 8 | 50.7202 | 2.7833 | 1.78800 | 47.37 |
| 9 | 32.5176 | 8.3335 | 1.49700 | 81.54 |
| 10 | −1421.9893 | DD[10] | | |
| 11 | −190.1831 | 5.1870 | 1.92286 | 18.90 |
| 12 | −113.8834 | 4.4052 | 1.48749 | 70.24 |
| 13 | 31.9482 | DD[13] | | |
| 14(St) | ∞ | 0.7945 | | |
| 15 | 34.6333 | 2.2281 | 1.88300 | 40.76 |
| 16 | 25.8206 | 6.1211 | 1.59522 | 67.73 |
| 17 | −92.5123 | 2.1111 | | |
| 18 | 81.4665 | 8.1521 | 1.84666 | 23.88 |
| 19 | 122.5080 | 3.9411 | 1.74400 | 44.79 |
| 20 | 16.6545 | 8.3335 | | |
| 21 | 19.9100 | 7.8228 | 1.49700 | 81.54 |
| 22 | 38.0541 | 12.6446 | | |
| 23 | ∞ | 1.1111 | 1.51633 | 64.14 |
| 24 | ∞ | 3.3971 | | |
| 25(Sim) | ∞ | | | |

TABLE 10

| | Example 5 | | |
|---|---|---|---|
| | Infinity | Middle | Closest |
| β | 0.00 | −0.02 | −0.03 |
| f | 100.00 | 97.29 | 94.55 |

TABLE 10-continued

| Example 5 | | | |
|---|---|---|---|
| | Infinity | Middle | Closest |
| FNo. | 1.94 | 1.98 | 2.01 |
| 2ω[°] | 10.8 | 10.4 | 10.2 |
| DD[10] | 5.59 | 7.03 | 8.52 |
| DD[13] | 11.76 | 10.32 | 8.83 |

Table 11 shows values corresponding to condition expressions (1) to (8) of the imaging lenses of Examples 1 to 5. The values shown in Table 11 are with respect to the d-line.

TABLE 11

| No. | | Example 1 | Example 2 | Example 3 | Example 4 | Example 5 |
|---|---|---|---|---|---|---|
| (1) | −f2/f | 0.55 | 0.58 | 0.75 | 0.67 | 0.61 |
| (2) | vn2 | 67.73 | 70.24 | 81.54 | 81.54 | 70.24 |
| (3) | f1/f3 | 0.79 | 0.68 | 0.51 | 0.52 | 0.57 |
| (4) | (R3r − R3f)/(R3r + R3f) | 0.35 | 0.31 | 0.26 | 0.32 | 0.31 |
| (5) | f1/f | 0.72 | 0.72 | 0.75 | 0.72 | 0.71 |
| (6) | f3/f | 0.92 | 1.06 | 1.49 | 1.38 | 1.23 |
| (7) | −f1/f2 | 1.30 | 1.25 | 1.00 | 1.08 | 1.17 |
| (8) | −f3/f2 | 1.66 | 1.83 | 1.97 | 2.06 | 2.03 |

As can be seen from the above-described data, each of the imaging lenses of Examples 1 to 5 has a compact configuration achieving size reduction in the optical axis direction and the radial direction, has a small F-number in the range from 1.9 to 2.0 in the state where the imaging lens is focused on an object at infinity, and achieves high optical performance for a wide range of object distance with low fluctuation of aberrations during focusing.

Next, an imaging apparatus according to an embodiment of the disclosure is described. FIG. 11 illustrates the schematic configuration of an imaging apparatus 10, which is one example of the imaging apparatus according to an embodiment of the disclosure, employing an imaging lens 1 according to the embodiments of the disclosure. Examples of the imaging apparatus 10 include a motion-picture camera, a broadcasting camera, a still camera, a video camera, etc.

The imaging apparatus 10 includes the imaging lens 1, a filter 2 disposed on the image side of the imaging lens 1, and an image sensor 3 disposed on the image side of the filter 2. The imaging lens 1 includes a first lens group G1, a second lens group G2, and a third lens group G3. It should be noted that, in FIG. 11, each lens group is schematically shown, and a stop included in the imaging lens 1 is not shown. The image sensor 3 converts an optical image formed by the imaging lens 1 into an electric signal. As the image sensor 3, a CCD (Charge Coupled Device) or a CMOS (Complementary Metal Oxide Semiconductor) may be used, for example. The image sensor 3 is disposed such that the imaging surface thereof is positioned in the same position as the image plane of the imaging lens 1.

The imaging apparatus 10 also includes a signal processing unit 5 that processes the signal outputted from the image sensor 3, a display unit 6 on which an image formed by the signal processing unit 5 is displayed, and a focus control unit 8 that controls focusing of the imaging lens 1. It should be noted that, although one image sensor 3 is shown in FIG. 11, the imaging apparatus of the disclosure is not limited to the above-described example, and may be a so-called three-sensor imaging apparatus which includes three image sensors.

The present disclosure has been described with reference to the embodiments and the examples. However, the disclosure is not limited to the above-described embodiments and examples, and various modifications may be made to the disclosure. For example, the values of the radius of curvature, the surface distance, the refractive index, the Abbe number, etc., of each lens are not limited to the values shown in the above-described examples, and may be different values.

What is claimed is:

1. An imaging lens consisting of, in order from the object side, a first lens group having a positive refractive power, a second lens group having a negative refractive power, a stop, and a third lens group having a positive refractive power, wherein focusing is effected by moving only the second lens group along the optical axis direction, the first lens group comprises at least three positive lenses and at least two negative lenses, the second lens group comprises a negative lens, the third lens group comprises at least three positive lenses and at least two negative lenses, and the condition expression (1) below is satisfied:

$$0.53 < -f2/f < 0.9 \qquad (1),$$

where f2 is a focal length of the second lens group, and f is a focal length of the entire system when the imaging lens is focused on an object at infinity.

2. The imaging lens as claimed in claim 1, wherein the condition expression (2) below is satisfied:

$$66 < vn2 < 98 \qquad (2),$$

where vn2 is an Abbe number with respect to the d-line of the most image-side negative lens of the second lens group.

3. The imaging lens as claimed in claim 1, wherein the condition expression (3) below is satisfied:

$$0.2 < f1/f3 < 0.85 \qquad (3),$$

where f1 is a focal length of the first lens group, and f3 is a focal length of the third lens group.

4. The imaging lens as claimed in claim 1, wherein the condition expression (4) below is satisfied:

$$0.1 < (R3r - R3f)/(R3r + R3f) < 0.5 \qquad (4),$$

where R3f is a radius of curvature of the object-side surface of the most image-side positive lens of the third lens group, and R3r is a radius of curvature of the image-side surface of the most image-side positive lens of the third lens group.

5. The imaging lens as claimed in claim 1, wherein the condition expression (5) below is satisfied:

$$0.62 < f1/f < 1.2 \qquad (5),$$

where f1 is a focal length of the first lens group.

6. The imaging lens as claimed in claim 1, wherein the condition expression (6) below is satisfied:

$$0.6 < f3/f < 2.3 \qquad (6),$$

where f3 is a focal length of the third lens group.

7. The imaging lens as claimed in claim 1, wherein the condition expression (7) below is satisfied:

$$0.5 < -f1/f2 < 1.5 \qquad (7),$$

where f1 is a focal length of the first lens group.

8. The imaging lens as claimed in claim 1, wherein the condition expression (8) below is satisfied:

$$1.5 < -f3/f2 < 4.5 \qquad (8),$$

where f3 is a focal length of the third lens group.

9. The imaging lens as claimed in claim 1, wherein the first lens group comprises a cemented lens formed by, in order from the object side, a biconvex lens and a biconcave lens that are cemented together.

10. The imaging lens as claimed in claim 1, wherein the second lens group consists of one negative lens.

11. The imaging lens as claimed in claim 1, wherein the second lens group consists of a cemented lens formed by one negative lens and one positive lens that are cemented together.

12. The imaging lens as claimed in claim 1, wherein the condition expression (1-1) below is satisfied:

$$0.54 < -f2/f < 0.85 \qquad (1\text{-}1).$$

13. The imaging lens as claimed in claim 2, wherein the condition expression (2-1) below is satisfied:

$$67 < vn2 < 88 \qquad (2\text{-}1).$$

14. The imaging lens as claimed in claim 3, wherein the condition expression (3-1) below is satisfied:

$$0.3 < f1/f3 < 0.8 \qquad (3\text{-}1).$$

15. The imaging lens as claimed in claim 4, wherein the condition expression (4-1) below is satisfied:

$$0.15 < (R3r - R3f)/(R3r + R3f) < 0.45 \qquad (4\text{-}1).$$

16. The imaging lens as claimed in claim 5, wherein the condition expression (5-1) below is satisfied:

$$0.65 < f1/f < 1 \qquad (5\text{-}1).$$

17. The imaging lens as claimed in claim 6, wherein the condition expression (6-1) below is satisfied:

$$0.65 < f3/f < 1.9 \qquad (6\text{-}1).$$

18. The imaging lens as claimed in claim 7, wherein the condition expression (7-1) below is satisfied:

$$0.6 < -f1/f2 < 1.4 \qquad (7\text{-}1).$$

19. The imaging lens as claimed in claim 8, wherein the condition expression (8-1) below is satisfied:

$$1.6 < -f3/f2 < 4 \qquad (8\text{-}1).$$

20. An imaging apparatus comprising the imaging lens as claimed in claim 1.

* * * * *